United States Patent [19]

McGinness

[11] 4,301,740

[45] Nov. 24, 1981

[54] SUSPENSION SYSTEM FOR A WHEEL ROLLING ON A FLAT TRACK

[76] Inventor: Robert A. Frosch, Administrator of the National Aeronautics and Space Administration, with respect to an invention of Houston D. McGinness, Los Angeles, Calif.

[21] Appl. No.: 961,833

[22] Filed: Nov. 17, 1978

[51] Int. Cl.[3] .......................... B61F 3/00; B61J 1/12; H01G 3/04

[52] U.S. Cl. .................................. 105/1 A; 105/171; 105/180; 105/218 R; 248/425; 104/83

[58] Field of Search .......... 105/180, 164, 171, 192 R, 105/1 A, 136, 178, 210, 218 R; 248/425, 429; 308/3, 16

[56] References Cited

U.S. PATENT DOCUMENTS

| | | | |
|---|---|---|---|
| 2,103,713 | 12/1937 | Dietrich | 105/180 |
| 3,707,928 | 1/1973 | Germer | 105/1 A |
| 3,711,055 | 1/1973 | Schultz et al. | 105/1 A |
| 4,064,809 | 12/1977 | Mulcahy | 105/180 |

*Primary Examiner*—Richard A. Bertsch

*Attorney, Agent, or Firm*—Paul F. McCaul; John R. Manning

[57] ABSTRACT

An improved suspension system for an uncrowned wheel rolling on a flat track characterized by a wheel frame assembly including a wheel frame and at least one uncrowned wheel connected in supporting relation with the frame and adapted to be seated in rolling engagement with a flat track, a load supporting bed, and a plurality of flexural struts interconnecting the bed in supported relation with the frame, each of said struts being disposed in a plane passing through the center of the uncrowned wheel surface along a line substantially bisecting the line of contact established between the wheel surface and the flat surface of the truck and characterized by a modulus of elasticity sufficient for maintaining the axis of rotation for the wheel in substantial parallelism with the line of contact established between the surfaces of the wheel and track.

10 Claims, 11 Drawing Figures

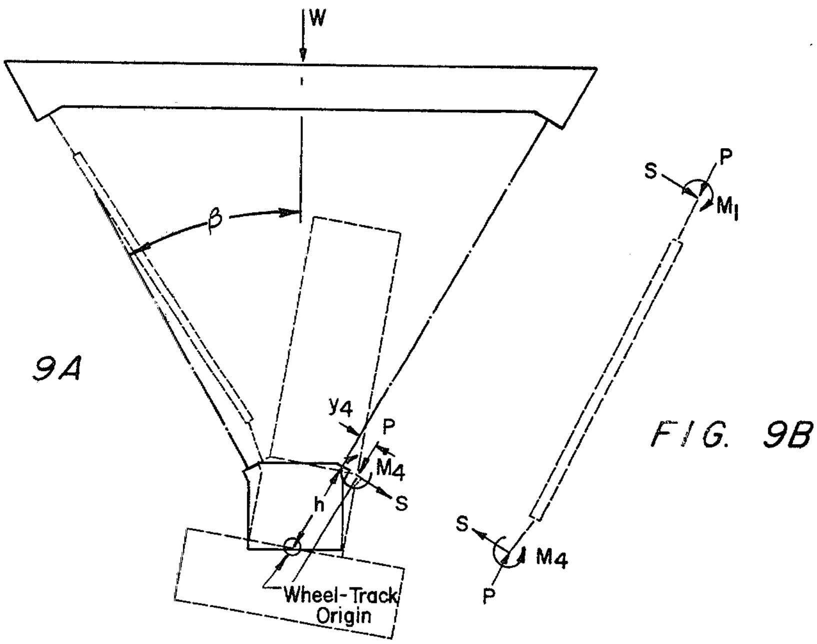
FIG. 9A
FIG. 9B
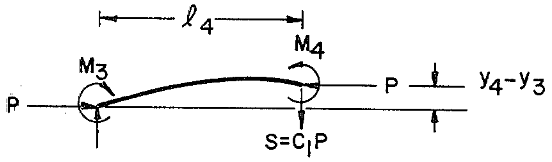
FIG. 10

SUSPENSION SYSTEM FOR A WHEEL ROLLING ON A FLAT TRACK

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The invention generally relates to suspension systems for supporting moving loads and more particularly to an improved suspension system for an uncrowned wheel rolling on a flat track and adapted for use in supporting large track-mounted antennas.

Suspension systems for wheel assemblies employed in transporting massive loads along flat tracks tend to be plagued by problems introduced because of misalignment introduced between the surface of the track and the surface of the wheel. Such misalignment, in turn, introduces error in load distribution along contact interfaces established between the surfaces of the wheels and the tracks. It is desirable that loading along the linear area of contact which, as a practical matter, comprises a line parallel to the axis of the wheel, be symmetrical and nearly as uniform as possible. Where the loading is not symmetrical an interface moment will exist between the wheel and the track. The effect of the moment is to increase load intensity at one edge of the wheel while reducing it at the other.

2. Description of the Prior Art:

The prior art is, of course, replete with teachings of resilient members employed in coupling axles of wheels to load-bearing trucks. For example, the following patents were discovered during the course of the search conducted for the invention:

| | | |
|---|---|---|
| Brown | 400,544 | April 2, 1889 |
| Rossell | 2,861,522 | Nov. 25, 1958 |
| Hirst et al | 2,954,747 | Oct. 4, 1960 |
| Hirst | 3,191,551 | June 29, 1965 |
| Weber | 3,286,653 | Nov. 22, 1966 |
| Germer | 3,707,928 | Jan. 2, 1973 |
| Julien | 3,818,841 | June 25, 1974 |

It is noted that the patent to Germer U.S. Pat. No. 3,707,928 discloses vertically aligned leaf springs in a suspension system employed in coupling a car body to a wheel axle. The patents to Hirst and Rossell disclose rubber springs for supporting axles for track-mounted vehicles. The patent to Weber shows that it is old to employ vertically inclined coil springs in supporting relation with the axle. The patents to Brown and Julien disclose frames for mounting axles.

Additionally, U.S. Pat. No. 3,711,055 which issued Jan. 16, 1973 to Roger K. Schulz et al discloses a load bearing apparatus for rail-mounted satellite tracking antennas, or other massive structures which utilize a four bar wheel-supporting linkage to maximize the area of contact between the supporting wheels and the rails, and hence to minimize contact stresses between the wheels and the rail.

The suspension system disclosed by the patent to Schulz et al, in effect, consists of sloping, rigid links connecting a base frame to a wheel frame with the end links thereof being pivoted in bearings. It can be shown mathematically, from data taken from engineering designs of known suspension systems for the azimuth bearing of large antennas, the maximum wheel-track loading intensityy can be increased by 39% over an ideal value. If bearing friction coefficient is increased to 0.30 the 39% increase in intensity would increase to 108%, more than twice the ideal value.

It is, therefore, the general purpose of the instant invention to provide an improved suspension system for the azimuth bearing of large antennas in which maximum wheel-track loading intensity is increased by only 1.15% over the ideal value.

OBJECTS AND SUMMARY OF THE INVENTION

It is an object of the invention to provide an improved suspension system for an uncrowned wheel rolling on a flat track.

It is another object to provide a flexure strut wheel suspension adapted to maintain a wheel flat against a flat surface track and maintain a small interface moment.

It is another object to provide a wheel suspension system adapted to keep an uncrowned wheel flat against a flat surface track and limit interface movement to small values.

It is another object to provide in combination with a track-supported antenna an improved suspension system for an uncrowned wheel rolling on a flat track and characterized by uniform loading along a contact area parallel to the wheel axis.

These and other objects and advantages are achieved through a suspension system for an uncrowned wheel rolling on a flat track characterized by a wheel frame assembly including a wheel frame and at least one uncrowned wheel connected in supporting relation with the frame adapted to be seated in rolling engagement with a flat upper surface of a track, a load supporting bed for supporting a vertical load and a plurality of flexural strut members interconnecting the bed in supported relation with the wheel frame, as will become more readily apparent by reference to the following description and claims in light of the accompanying drawings.

BRIEF DESCRIPTION OF THE DRAWINGS

FIGS. 6 through 10 are diagrammatic views employed in providing an analysis of the suspension system.

DESCRIPTION OF THE PREFERRED EMBODIMENT

Figure 1:
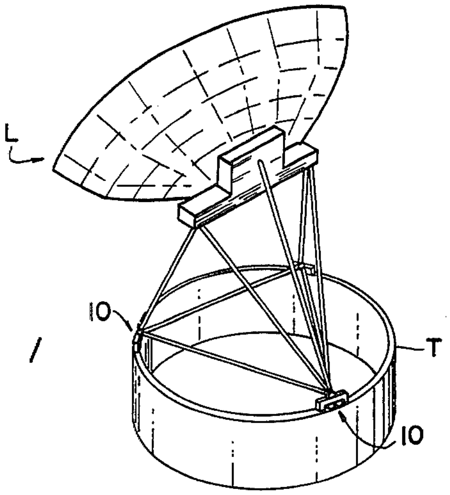
FIG. 1 is a perspective schematic view illustrating a use environment for the suspension system of the instant invention.

Referring now to the drawings with more particularity, there is shown in FIG. 1 a tracking antenna L supported for angular displacement about a vertical axis by a plurality of wheel assemblies 10 seated in rolling engagement with an annular track T. It is important to note that the details of the antenna L and track T form no specific part of the claimed invention. Therefore, a detailed description of the antenna and track is omitted in the interest of brevity. However, it should be appreciated that the wheel assembly 10 is adapted to support very large wheel-born loads for movement along fixed supporting tracks such as are employed in supporting massive tracking antennas of the type currently used in the tracking of deep-space vehicles and the like.

Figure 2:
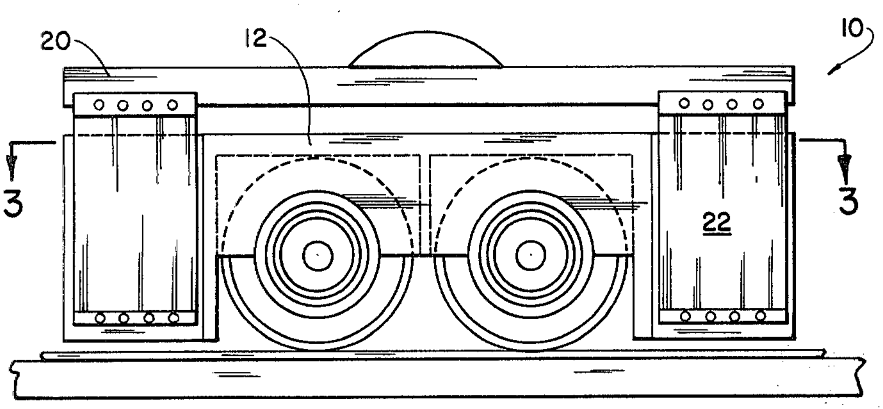
FIG. 2 is a side elevational view of a wheel frame assembly including a suspension system embodying the principles of the instant invention.
Figure 3:
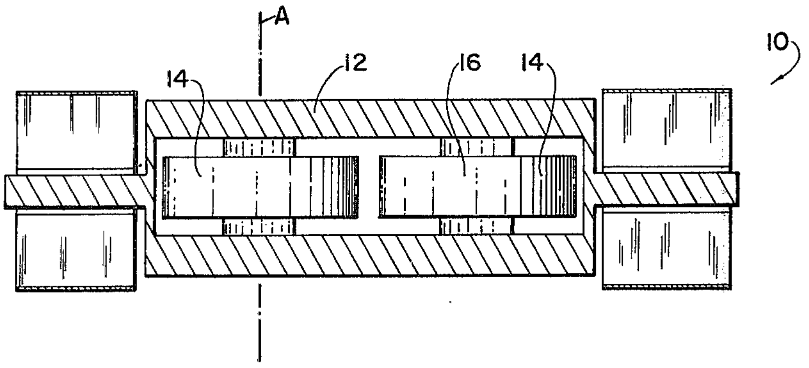
FIG. 3 is a partially sectioned view taken generally along line 3—3 of FIG. 2.

Referring now to FIGS. 2 and 3, it can be seen that the wheel assembly 10 includes a wheel frame 12 within which there is mounted a pair of wheels 14 arranged in substantial coplanar relation. It is important to note that the wheels 14 include uncrowned or cylindrical rolling surfaces 16 which establish a linear area of contact with a flat upper surface 18 of the track T. The particular manner in which the wheels 14 are mounted in the wheel frame 12 form no part of the claimed invention. However, it is to be understood that each of the wheels is supported for rotation about an axis of rotation, designated A, FIG. 3.

Connected to the wheel frame 12 there is a load-supporting bed 20 which serves as a support for mounting structure for the antenna L. The particular manner in which the antenna L is connected with the load supporting bed 20 is deemed to be a matter of convenience and forms no part of the claimed invention. Therefore, a detailed description of the antenna and the mounting thereof is omitted, also in the interest of brevity.

Figure 4:
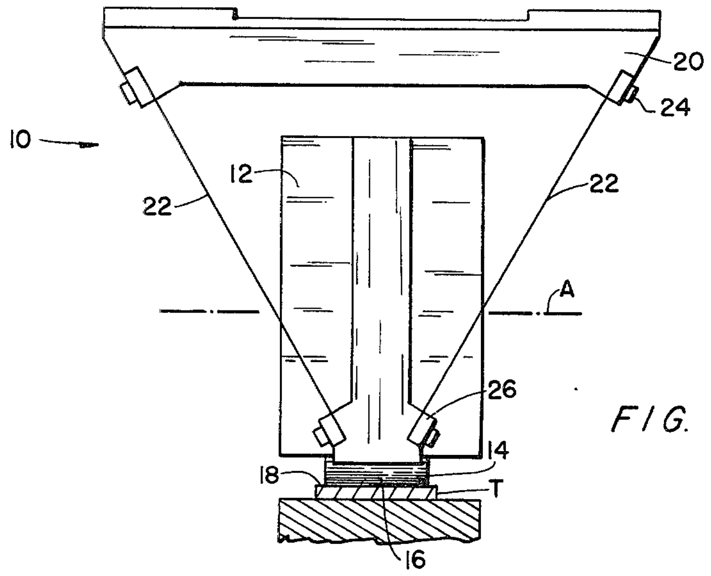
FIG. 4 is an end elevational view of the wheel frame assembly shown in FIGS. 1 and 2.

It is important to note that, as shown in FIGS. 2 through 4, the wheel frame 12 lends vertical support to the load supporting bed 20 through a plurality of flexure struts, designated 22. The struts are disposed in downwardly converging planes which intersect the track T along a line bisecting a line defined by the linear area of contact established between the engaged surfaces 16 and 18 of the wheel 14 and track T, respectively.

In practice, each of the flexure struts 22 comprises a flexural member rigidly affixed at its upper end to the bed 20, by suitable fasteners 24, and to the wheel frame 12 by fasteners 26. The fasteners 26 are similar in design and function to the fasteners 24 and may be varied as desired. Since the particular manner in which the flexure struts 22 are connected with the wheel frame 12 and the load supporting bed 20, form no part of the claimed invention, a detailed description thereof is omitted. However, it should be understood that the flexure struts 22 are securely and rigidly connected to the wheel frame and bed.

Figure 6:
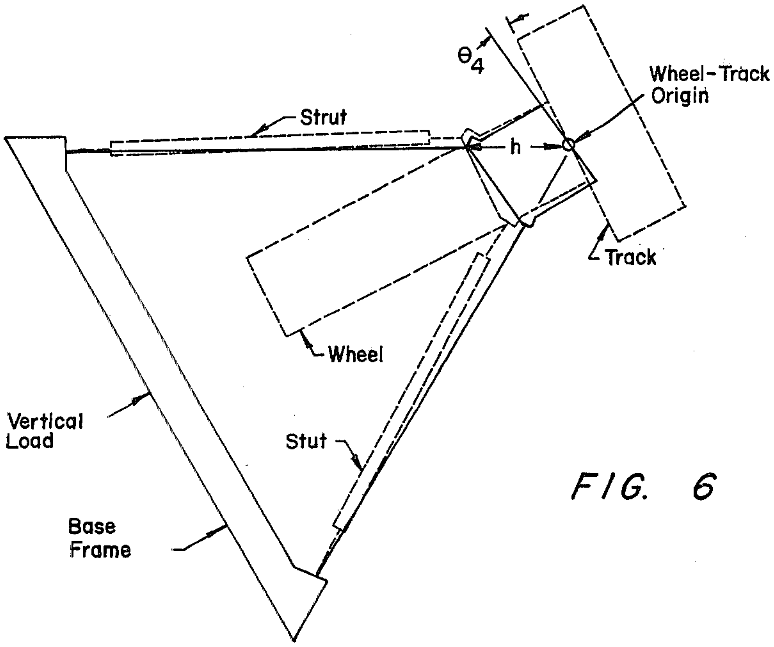

As illustrated in FIGS. 2 through 4, each of the flexure struts 22 comprises a flexural member which when in a planar configuration lies in a plane intersecting the top surface of the track along a line coincident with a line comprising the center line of the path of the surface 16 of the wheels 14. When in this position, the load distribution along the line defined by the linear area of contact of the surface 16 with the surface 18 is symmetrical about the center of the line, or contact center, herein referred to as WHEEL-TRACK ORIGIN. The moment about the WHEEL-TRACK ORIGIN is zero. As can be appreciated, this condition minimizes peak contact stresses and produces minimal axial forces in the struts 22. Hence, this position for the struts is considered to comprise an ideal position and is represented by the solid line sketch of FIG. 6. If the track is caused to be displaced in a manner such that the cross section thereof rotates from its ideal position by a small angle $\theta_4$, as shown in FIG. 6, the struts 22 will deform or become displaced. The reactive moments and shears on the wheel frame 12, together with the axial load in the strut, sum to form an interface moment which, under special conditions can be zero, but which is usually finite. In all practical cases, the interface moment will be small enough to allow the wheel to remain flat against the track.

Figure 5:
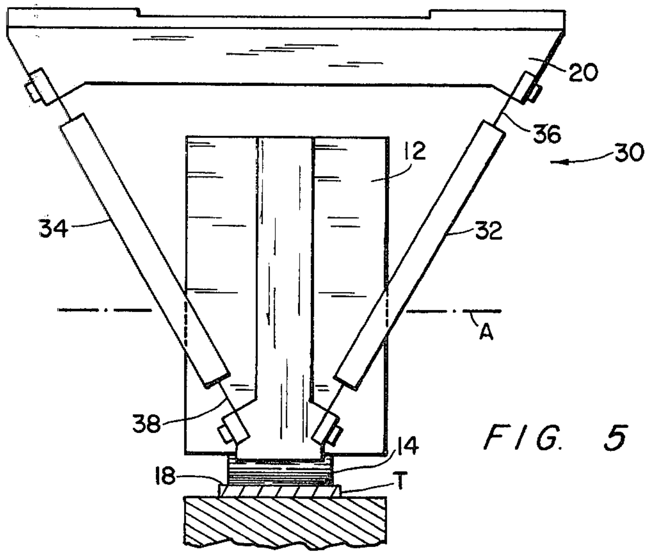
FIG. 5 is an end elevational view depicting a modification of the embodiment shown in FIGS. 2 through 4.

Referring for a moment to FIG. 5, wherein is illustrated a modification of the wheel assembly 10 comprising a wheel assembly 30. As a practical matter, the wheel assembly 30 is distinguishable from the wheel assembly 10 by modified flexure struts 32. Each of these struts have a rigid center section 34 and flexural end sections 36 and 38 connected to the load supporting bed 20 and the wheel frame 12, respectively. Preferably, the connection is effected in a manner similar to that in which the flexure strut 22 is connected with the wheel frame 12 and bed 20.

In a mathematical analysis of the flexure struts 32, hereinafter provided, it is assumed that the center section 34 of the strut 32 is of a length m, FIG. 7, while the flexure end sections 36 and 38 are of lengths $l_1$ and $l_4$. The flexure end sections 36 and 38 are characterized by constant properties over their lengths but the property of flexure end section 36 may differ from end section 38.

Figure 7:
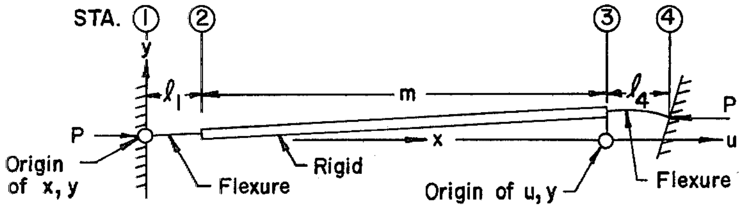

Also, an analysis of the struts as a beam column, as shown in FIG. 7, will indicate a moment and shear at station 4, the point at which the strut attaches to the wheel frame 12. In the analysis all parts except the support struts are considered to be rigid and, as a practical matter, it is considered that there is only one strut on each side of a wheel 14, the properties of which are equal to the sum of two or more identical struts on each side. Further, while the following analysis is provided for the flexural struts 32, herein referred to as a double-flexure strut, it is important to note that the analysis can be applied to the struts 22, herein referred to as a single-flexure strut, provided that the dimension m, FIG. 7, is made equal to zero.

It is convenient to employ the solutions of the fourth-order differential equation for the cases at hand, which are limited to small deflections and have no transverse forces between the ends of the beam elements. For these conditions the following equation from Sechler, E. E., *Elasticity In Engineering,* John Wiley and Sons, 1952, applies:

$$\frac{d^4y}{dx^4} + k^2\frac{d^2y}{dx^2} = 0 \tag{1}$$

where
$K^2 = P/EI$
P is the column load
E is the modulus of elasticity
M is the interface moment
I is moment of inertia of area about the axis perpendicular to the plane of bending of the strut
y = strut deflection The general solution of (1) is $$y = A\sin kx + B\cos kx + Cx + D \tag{2}$$

where A, B, C, and D are constants to be determined by the end conditions. The slope dy/dx and moment M are obtained by differentiating (2) and are:

$$(dy/dx) = Ak\cos kx = Bk\sin kx + C \tag{3}$$

$$M = EI\frac{d^2y}{dx^2} = -P(A \sin kx + B \cos kx) \quad (4)$$

The shear S perpendicular to the undeflected beam axis is:

$$S = \frac{dM}{dx} + P\frac{dy}{dx} = CP \quad (5)$$

The constants A, B, C, and D can be determined by applying two proper end conditions to each end of each beam column element. In each case to be considered, the deflection and slope are both zero at the left-hand end of the strut as pictured in FIG. 7, that is, at the origin of the X-axis. At the right-hand end of the strut at $x=l$, the slope has the known value $\theta_4$, that is, it is equal to the tilt of the track. With the coordinate system shown in FIG. 7, the value of the right end slope shown is negative. Also the deflection at the right-hand end is $y_4$, which is related to $\theta_4$ as follows:

$$y_4 = -h\theta_4 \quad (6)$$

where the distance h is shown in FIG. 7.

For the case of a single flexure of length l and of constant cross section, i.e. $m=0$, as illustrated in FIG. 4, the following equations may be written from (2) and (3):

$$y_{x=0} = B + D = 0 \quad (7)$$

$$\left.\frac{dy}{dx}\right]_{x=0} = kA + C = 0 \quad (8)$$

$$y_{x-l} = (\sin kl)A + (\cos kl)B + lC + D = -h\theta_4 \quad (9)$$

$$\left.\frac{dy}{dx}\right]_{x=l} = (k \cos kl)A - (kl \sin kl)B + C = \theta_4 \quad (10)$$

The characteristic equation of (7), (8), (9), and (10) is:

$$k[2(1-\cos kl) - kl \sin kl] = 0 \quad (11)$$

The lowest nontrivial value of k satisfying (11) is:

$$kl = 2\pi \quad (12)$$

Since $k=\sqrt{P/EI}$, the following critical value of the column load, $P_{CR}$, is obtained:

$$P_{CR} = (4\pi^2 EI/l^2) \quad (13)$$

Solving (7), (8), (9), and (10) simultaneously, one obtains $$\frac{A}{\theta_4} = \frac{-h \sin kl - \frac{1}{k}(1 - \cos kl)}{2(1 - \cos kl) - kl \sin kl} \quad (14)$$

$$\frac{B}{\theta_4} = \frac{h(1 - \cos kl) + l - \frac{1}{k}\sin kl}{2(1 - \cos kl) - kl \sin kl} \quad (15)$$

$$C = -kA \quad (16)$$

$$D = -B \quad (17)$$

These values of A and B allow the equation for M to be evaluated for any value of X in terms of $\theta_4$. At $x=l$, the moment is $$\frac{M_4}{\theta_4} = \frac{M_{x=l}}{\theta_4} = P\left[\frac{h(1 - \cos kl) - l \cos kl + \frac{1}{k}\sin kl}{2(1 - \cos kl) - kl \sin kl}\right] \quad (18)$$

From (5), the shear S is constant over the beam length and is $$\frac{S}{\theta_4} = \frac{-kAP}{\theta_4} = P\frac{kh \sin kl + (1 - \cos kl)}{2(1 - \cos kl) - kl \sin kl} \quad (19)$$

If the shear is negative, the equilibrating force on the beam at the right-hand end, station 4, acts upward.

Since the forces and moment acting at the right-hand end of the beam are now known, the equal and opposite forces and moment acting on the wheel frame are also known, thus allowing the total moment about the wheel-track origin to be evaluated. This, by definition, is the interface moment being sought.

For the case of the support strut being composed of two flexures separated by a rigid centerpiece, FIG. 5, of length m, the forces and moment at station 4 of FIG. 7 can be determined in a similar but more complicated way. Referring to FIG. 7, the left flexure can be solved in terms of $y_2$ and $\theta_2$, the deflection and slope at station 2. Similarly, the right flexure can be solved in terms of $y_3$, $\theta_3$, $y_4$, $\theta_4$. Making use of relationships between $\theta_2$ and $\theta_3$, and between $y_2$ and $y_3$, and then employing two different moment equilibrium equations, the unknowns $y_2$ and $\theta_2$ can be obtained. Using subscripts 1 and 4 for the left and right flexures, respectively, the following are obtained:

$$y = A_1 \sin k_1x + B_1 \cos k_1x + C_1x + D \quad (20)$$

Using the boundary conditions $$y_{x=0} = 0,\ \frac{dy}{dx_{x=0}} = 0,\ y_{x=l_1} = y_2,\ \frac{dy}{dx_{x=l_1}} = \theta_2$$

the following values of the constants are obtained:

$$A_1 = \frac{(\sin k_1l_1)y_2 - \frac{1}{k_1}(1 \cos k_1l_1)\theta_2}{2(1 - \cos k_1l_1) - k_1l_1 \sin k_1l_1} \quad (21)$$

$$B_1 = \frac{-(1 - \cos k_1l_1)y_2 + \left(l_1 - \frac{1}{k_1}\sin k_1l_1\right)\theta_2}{2(1 - \cos k_1l_1) - k_1l_1 \sin k_1l_1} \quad (22)$$

$$D_1 = -B_1 \quad (23)$$

$$C_1 = k_1A_1 \quad (24)$$

The moment $M_1$ at station 1 is $$M_1 = M_{x=0} = -P\left[\frac{-(1 - \cos k_1l_1)y_2 + \left(l_1 - \frac{1}{k_1}\sin k_1l_1\right)}{2(1 - \cos k_1l_1) - k_1l_1 \sin k_1l_1}\right] \quad (25)$$

The shear at $X=0$ is $$S_{x=0} = PC_1 = -P\frac{(k_1 \sin k_1l_1)\,y_2 - (1 - \cos k_1l_1)\,\theta_2}{2(1 - \cos k_1l_1) - k_1l_1 \sin k_1l_1} \quad (26)$$

The deflection of the right flexure in terms of coordinate u (see FIG. 7) is $$y = A_4 \sin k_4u + B_4 \cos k_4u + C_4u + D_4 \quad (27)$$

Using the boundary conditions $$y_{u=0} = y_3 = y_2 + m\theta_2 \quad (28)$$

$$\left.\frac{dy}{du}\right]_{u=0} = \theta_3 = \theta_2$$

$$y_{u=l_4} = y_4 = -h\theta_4$$

$$\left.\frac{dy}{du}\right]_{x=l_4} = \theta_4$$

the following values of the constants are obtained:

$$A_4 = \frac{-(\sin k_4l_4)\,y_2 - \Big[m(\sin k_4l_4)}{2(1 - \cos k_4l_4) - k_4l_4 \sin k_4l_4} \quad (29)$$

$$\frac{-\frac{1}{k_4}(\cos k_4l_4 - k_4l_4 \sin k_4l_4)\Big]\theta_2}{2(1 - \cos k_4l_4) - k_4l_4 \sin k_4l_4}$$

$$\frac{-\Big[h(\sin k_4l_4) + \frac{1}{k_4}(1 - \cos k_4l_4)\Big]\theta_4}{2(1 - \cos k_4l_4) - k_4l_4 \sin k_4l_4}$$

$$B_4 = \frac{(1 - \cos k_4l_4)\,y_2 + \Big]\,m(1 - \cos k_4l_4)}{2(1 - \cos k_4l_4) - k_4l_4 \sin k_4l_4} \quad (30)$$

$$\frac{+\frac{1}{k_4}(\sin k_4l_4 - k_4l_4 \cos k_4l_4)\Big]\theta_2}{2(1 - \cos k_4l_4) - k_4l_4 \sin k_4l_4}$$

$$\frac{+\Big[h(1 - \cos k_4l_4) + \frac{1}{k_4}(k_4l_4 - \sin k_4l_4)\Big]\theta_4}{2(1 - \cos k_4l_4) - k_4l_4 \sin k_4l_4}$$

$$D_4 - y_2 + m\theta_2 - B_4 \quad (31)$$

$$C_4 = \theta_2 - k_4A_4 \quad (32)$$

The moment at u=0 is $$M_3 = M_{u=O} = -P\left\{\frac{(1 - \cos k_4l_4)\,y_2 + \Big[m(1 - \cos k_4l_4)}{2(1 - \cos k_4l_4) - k_4l_4 \sin k_4l_4}\right. \quad (33)$$

$$\frac{+\frac{1}{k_4}(\sin k_4l_4 - k_4l_4 \cos k_4l_4)\Big]\theta_2}{2(1 - \cos k_4l_4) - k_4l_4 \sin k_4l_4}$$

$$\left.\frac{+\Big[h(1 - \cos k_4l_4) + \frac{1}{k_4}(k_4l_4 - \sin k_4l_4)\Big]\,\theta_4}{2(1 - \cos k_4l_4) - k_4l_4 \sin k_4l_4}\right\}$$

The moment at $u=l_4$ is $$M_4 = M_{u=l_4} = P\left\{\frac{(1 - \cos k_4l_4)y_2 + \Big[\mathrm{m}(1 - \cos k_4l_4)}{2(1 - \cos k_4l_4) - k_4l_4\, k_4l_4}\right. \quad (34)$$

$$\frac{+\frac{1}{k_4}(k_4l_4 - \sin k_4l_4)\Big]\theta_2}{2(1 - \cos k_4l_4) - k_4l_4 \sin k_4l_4}$$

$$\frac{+\Big[h(1 - \cos k_4l_4)}{2(1 - \cos k_4l_4) - k_4l_4 \sin k_4l_4}$$

$$\left.\frac{-\frac{1}{k_4}(k_4l_4 \cos k_4l_4 - \sin k_4l_4)\Big]\theta_4}{2(1 - \cos k_4l_4) - k_4l_4 \sin k_4l_4}\right\}$$

Figure 8:
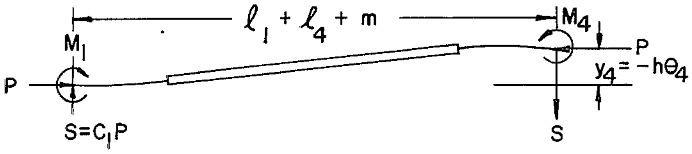

Now consider a free body diagram of the entire strut as shown in FIGS. 8 and 9, and write the moment equilibrium as follows:

$$(m + l_1 + l_4)S + M_1 - M_4 + Ph\theta_4 = 0 \quad (35)$$

Next consider a free body diagram of the right-hand flexure only, as shown in FIG. 10. From FIG. 7, it may be seen that $$y_4 - y_3 = -h\theta_4 - y_2 - m\theta_2 \quad (36)$$

The moment equilibrium of the right-hand flexure is $$l_4S + M_3 - M_4 - P(-h\theta_4 - y_2 - m\theta_2) = 0 \quad (37)$$

Substitute (25), (26), (33), and (34) into (35) and (37). This produces two independent equations in the unknowns $y_2$ and $\theta_2$ and with the known $\theta_4$ appearing on the right side of the equations as follows:

$$\Bigg[\frac{-(m + l_1 + l_4)k_1 \sin k_1l_1 + (1 - \cos k_1l_1)}{2(1 - \cos k_1l_1) - k_1l_1 \sin k_1l_1} \quad (38)$$

$$-\frac{(1 - \cos k_4l_4)}{2(1 - \cos k_4l_4) - k_4l_4 \sin k_4l_4}\Bigg]y_2$$

$$+\Bigg[\frac{(m + l_1 + l_4)(1 - \cos k_1l_1) - l_1 + \frac{1}{k_1} \sin k_1l_1}{2(1 - \cos k_1l_1) - k_1l_1 \sin k_1l_1}$$

$$-\frac{m(1 - \cos k_4l_4) + l_4 - \frac{1}{k_4} \sin k_4l_4}{2(1 - \cos k_4l_4) - k_4l_4 \sin k_4l_4}\Bigg]\,\theta_2$$

$$= \Bigg[\frac{h(1 - \cos k_4l_4) + l_4 \cos k_4l_4 + \frac{1}{k_4} \sin k_4l_4}{2(1 - \cos k_4l_4) - k_4l_4 \sin k_4l_4} - h\Bigg]\,\theta_2$$

$$\Bigg[1 - \frac{k_1l_1 \sin k_1l_1}{2(1 - \cos k_1l_1) - k_1l_1 \sin k_1l_1} \quad (39)$$

$$-\frac{2(1 - \cos k_4l_4}{2(1 - \cos k_4l_4) - k_4l_4 \sin k_4l_4}\Bigg]\,y_2$$

$$+\Bigg[m + \frac{l_4(1 - \cos k_1l_1}{2(1 - \cos k_1l_1) - k_1l_1 \sin k_1l_1}$$

$$-\frac{(2m + l_4)(1 - \cos k_4l_4)}{2(1 - \cos k_4l_4) - k_4l_4 \sin k_4l_4}\Bigg]\,\theta_2$$

-continued $$= \left[ \frac{(2h + l_4)(1 - \cos k_4 l_4)}{2(1 - \cos k_1 l_1) - k_1 l_1 \sin k_1 l_1} - h \right] \theta_4$$

When $y_2$ and $\theta_2$ have been evaluated from solving (38) and (39) simultaneously, $M_4$ can be obtained from (34), and S is $$S = PC_1 = -Pk_1 A_1 \quad (40)$$

Substitut8ing (21) into (40) results in $$S = -P \left[ \frac{k_1(\sin k_4 l_4) y_2 - (1 - \cos k_1 l_1)\theta_2}{2(1 - \cos k_1 l_1)\, h - k_1 l_1 \sin k_1 l_1} \right] \quad (41)$$

In FIG. 9B, a free body diagram of the support strut is shown with the forces P and S and the moment $M_4$ acting on the end which joins the wheel frame. FIG. 9A shows the equal and opposite forces and moment applied to the wheel frame. The clockwise moment about the wheel-track origin produced by both struts, and defined as the interface moment, is $$M_i = 2[M_4 + Py_4 + hS] \quad (42)$$

FIG. 8 shows that $y_4 = -h\theta_4$; thus (42) becomes $$M_i = 2[M_4 - Ph\theta_4 + hS] \quad (43)$$

Equation (43) applies to either the double-flexure strut or the single-flexure strut. For the former case, $y_2$ and $\theta_2$ must be obtained by solving (38) and (39) simultaneously, evaluating $M_4$ from (34) and S from (26). For the case of the single-flexure, Eq. (18) and (19) can be substituted into (43), yielding $$\left[ \frac{M_i}{\theta_4} \right]_{\substack{single \\ flexure}} = 2P \left[ \frac{\left(\frac{1}{k} + kh^2 + klh\right) \sin kl - l \cos kl}{2(1 - \cos kl) - kl \sin kl} \right]$$

Since it is possible for the numerator of the right side of (44) to be zero, the interface moment can be zero.

The effect of the interface moment on the wheel-track loading intensity, for the case when the wheel is flat against the track, can be approximated by assuming that the interface moment is equilibrated by a triangularly distributed load between the wheel and track. Let $w_1$ be the maximum intensity of the triangularly distributed load. The usual relationship between $w_1$ and $M_i$ is $$w_1 - (6M_i/L^2) \quad (45)$$

where L is the width of the wheel.

Let $w_2$ be the rectangularly distributed loading between the wheel and track caused by the total vertical load W acting on the wheel $$w_2 = (W/L) \quad (46)$$

The maximum loading intensity $w_{max}$ is the sum of $w_2$ and the absolute value of $w_1$, namely, $$w_{max} = w_2 + |w_1| \quad (47)$$

From FIG. 9A it is clear that $$P = (W/2 \cos \beta) \quad (48)$$

If (48) is substituted into (44) and the result substituted into (47), $$w_{max} = \frac{W}{L} \left\{ 1 + \left| \frac{6\theta_4}{L \cos \beta} \left[ \frac{\left(\frac{1}{k} + kh^2 + klh\right) \sin kl - l \cos kl}{2(1 - \cos kl) - kl \sin kl} \right] \right| \right\} \quad (49)$$

In this form the effect of the interface moment (of the single flexure configuration) on the contact load intensity can easily be compared to unity, which is the intensity loading factor when the interface moment is zero.

the critical column load $P_{CR}$ is the column load that produces instability or buckling regardless of the magnitude of compressive and/or bending stresses in the beam column. Its value is determined by end conditions which remain constant as the column load increases. The single-flexure crictical load, for the strut 22, is given by Eq. (13) and was derived by considering the slopes and deflections to be fixed at both ends.

The critical load for the general case of two different end flextures will not be discussed. However, the special case of the two and flexures, struts 32, being identical has a simple solution. From symmetry, it would be expected that the slope of the rigid connecting member would remain constant. The shear is also constant over the entire length of the strut. Therefore, at the end of the flexture which joins the rigid connecting member, the proper end conditions are constant slope and constant shear. At the other end of the flexure, the two end conditions are constant deflection and constant slope. The characteristic equation is formed by applying Eqs. (2) and (3) at, say, the left end, where X=0, and Eqs, (3) and (5) at the right end, where $X = l_2$. The resulting characteristic equation is $$Pk_1^2 \sin k_1 l_1 = 0 \quad (50)$$

The lowest nontrivial value of $k_1 l_1$ is $\pi$; hence $$P_{\substack{CR \\ DOUBLE \\ FLEXURE}} = \frac{\pi^2 EI}{l_1^2} \quad (51)$$

OPERATION

It is believed that in view of the foregoing description, and analysis, the operation of the invention herein disclosed is clearly apparent. However, in the interest of completeness the operation of the disclosed invention will be reviewed.

With the suspension system assembled in the manner hereinbefore described, each wheel assembly 10 is adapted to transport a load, such as an antenna L, along the track T. In the event the surface 18 of the track T is tilted, relative to the horizontal, as the wheels 14 roll along the surface 18 of the track T the surface 16 of the wheel 14 will tilt, relative to the horizontal, so that the linear area of contact established by the contact of this surface with the surface 18 also will tilt. This assures that the wheels remain flat against the track and are facilitated by the struts 22, or 34, as the case may be, which deflect. Thus the area of contact between the surfaces of the wheel and track is maintained in parallelism with the axis of the wheel 14. Consequently, loading along the area is symmetrical and nearly uniform as possible. Thus load intensity throughout the area remains substantially uniform while the interface moment is limited to relatively small values.

In view of the foregoing, it should be apparent that the suspension system of the instant invention provides a practical solution to the problem of maintaining a uniform load distribution across the face of a wheel of an uncrowned wheel even though the flat surface upon which the wheel is caused to roll does not remain in a substantially fixed plane. As a result, it is possible to avoid effects of nonsymmetrical loading which frequently attends the use of wheel supported load-bearing systems such as trucks and the like mounted for travel along flat tracks.

What is claimed is:

1. In combination with a truck for supporting a moving load including a wheel having an uncrowned wheel surface adapted to roll along a track having a flat upper surface, a suspension system comprising:

A. a wheel frame supporting the wheel for rolling engagement with the track along a moving line of contact transversely related to the flat upper surface thereof;

B. a load supporting bed; and

C. means for attaching said bed to said wheel frame including at least one pair of flexure support struts interconnecting said bed and said wheel frame, said struts being disposed in angularly related planes intersecting the top surface of the track along a line substantially bisecting a line of contact established between the uncrowned wheel surface and the flat upper surface of the track.

2. A suspension system as defined in claim 1 wherein each of said struts comprises a flexural member having an upper end rigidly affixed to said load supporting bed, a lower end rigidly affixed to said wheel frame, and characterized by a modulus of elasticity sufficient to permit the axis of the wheel to pivot in a plane of motion substantially bisecting the angle defined by said angularly related planes.

3. A suspension system as defined in claim 1 wherein the axis for said wheel and said line of contact are disposed in parallelism and each of the struts comprises a flexural member characterized by a modulus of elasticity sufficient for maintaining the axis of rotation for said wheel in substantial parallelism with said moving line of contact as the wheel is caused to roll along said track.

4. A suspension system as defined in claim 3 wherein each of said struts is characterized by a rigid body having a pair of opposed flexural end portions.

5. A suspension system as defined in claim 3 wherein the modulus of elasticity of each of said struts is substantially constant throughout its length.

6. A suspension system as defined in claim 5 wherein said moving load comprises an antenna supported for annular displacement about a vertical axis.

7. In combination with a tracking antenna, means adapted to support the antenna for angular displacement about a vertical axis including a movable truck adapted to roll along an annular track characterized by a flat upper surface disposed in a substantially horizontal plane, a suspension system including:

A. a wheel frame;

B. at least one wheel mounted in said wheel frame and supported thereby for rotation about an axis of rotation substantially paralleling a reference line disposed in said horizontal plane, said wheel being characterized by an uncrowned annular surface contacting the flat surface of said track along a line defining a line of contact paralleling said axis, said line of contact being tiltable with respect to said reference line as the flat surface is caused to tilt relative to said horizontal plane;

C. a load supporting bed connected in load supporting relation with said antenna; and D. means connecting said wheel frame to said bed in load-supporting relation therewith including a pair of flexural members disposed in downwardly converging planes intersecting said flat upper surface at the midpoint of said line of contact, each of said flexural members being characterized by a modulus of elasticity sufficient to permit the axis of said wheel to maintain a substantially constant state of parallelism with said line of contact as the line is caused to tilt with respect to said reference line.

8. An improved suspension system for an uncrowned wheel adapted to be supported for rolling displacement along a planar surface comprising:

A. a wheel frame having connected thereto at least one wheel characterized by an uncrowned peripheral surface adapted to seat on a planar supporting surface for defining between the surfaces a line of contact paralleling the rotational axis of the wheel;

B. a load supporting bed disposed above said frame; and

C. means for interconnecting the bed in supported relation with said wheel frame including at least one flexible strut of a planar configuration disposed in a downwardly inclined plane intersecting said supporting surface at a point located along said line of contact and having its uppermost end portion rigidly connected to the bed and its lowermost end portion rigidly connected to said frame.

9. In a suspension system as defined in claim 8 wherein said strut is characterized by a rigid center section and at least one flexible end section.

10. A suspension system as defined in claim 8 wherein said flexible strut comprises an axially-loaded strut.

* * * * *